United States Patent [19]

Teyssie et al.

[11] 4,362,837

[45] Dec. 7, 1982

[54] PROCESS FOR PREPARING PRODUCTS CONTAINING POLYMER CHAINS HAVING IONIC LINKS AND THEIR USE

[75] Inventors: Philippe T. Teyssie, Neuville en Condroz; Robert J. Jerome, Tilff-Esneux; Guy J. Broze, Huy, all of Belgium

[73] Assignee: Unibra Societe Anonyme, Brussels, Belgium

[21] Appl. No.: 246,771

[22] Filed: Mar. 23, 1981

[30] Foreign Application Priority Data

Mar. 21, 1980 [LU] Luxembourg ............................ 82286

[51] Int. Cl.³ ................................................. C08F 8/44
[52] U.S. Cl. .................................... 524/400; 524/398; 524/399; 525/366; 525/370
[58] Field of Search ............... 260/31.2 MR; 525/370, 525/366; 524/400, 398, 399

[56] References Cited

U.S. PATENT DOCUMENTS

| 3,632,546 | 1/1972 | Haung et al. | 260/31.2 MR |
| 3,802,912 | 4/1974 | Otocka | 525/370 |
| 4,012,567 | 3/1977 | Loveless | 525/370 |
| 4,172,820 | 10/1979 | Lundberg | 525/366 |
| 4,292,231 | 9/1981 | Gabriel et al. | 525/370 |

FOREIGN PATENT DOCUMENTS

| 989998 | 5/1976 | Canada | 525/370 |
| 1179252 | 1/1970 | United Kingdom . | |

Primary Examiner—William F. Hamrock
Attorney, Agent, or Firm—Sughrue, Mion, Zinn, Macpeak & Seas

[57] ABSTRACT

Viscous, homogeneous and thermoreversible gels containing polymer chains are obtained by a process in which a solution of a prepolymer or polymer which contains at least one free acid group at each chain end in a non polar solvent selected among the aliphatic, alicyclic and aromatic hydrocarbons having a dielectric constant of less than about 3 is reacted at room temperature with a stoechiometric amount, based on the acid group content of the polymer, of a metal aliphatic alkoxide so as to neutralize all the free acid groups and a sufficient amount of the non polar solvent is distilled for removing, in a substantially quantitative manner, the aliphatic alcohol formed by said reaction.

13 Claims, 4 Drawing Figures

FIG. 3

FIG. 4

PROCESS FOR PREPARING PRODUCTS CONTAINING POLYMER CHAINS HAVING IONIC LINKS AND THEIR USE

FIELD OF THE INVENTION

This invention relates to a process for preparing products containing polymer chains having ionic links, in which a solution of a prepolymer or polymer containing at least one free acid group at each chain end in a non polar solvent is reacted with a metal alkoxide which may be dissolved or suspended in a polar solvent, such as an aliphatic alcohol.

PRIOR ART

Processes are known in which metal salts of polymers, such as polybutadiene, containing a carboxylic group at each end of the polymer chain are prepared by reaction of said polymers dissolved in benzene with an alkoxide, such as methoxide, of a metal of the groups 1 to 3 of the Periodic Table dissolved or suspended in an aliphatic lower alcohol, such as methanol.

Although in said known processes, the reaction takes place at temperatures higher than the room temperature, the obtained products are only partially neutralized or have conversion rates of 5 to 100% and are frequently heterogeneous.

In another known process, a substantially linear homopolymer or copolymer of butadiene having attached thereto at least one carboxyl group per hundred polymerized butadiene units dissolved in freshly distilled chloroform is mixed with at least one hydrocarbon soluble alkoxide of a metal from groups 1 to 3 of the Periodic Table. In this known process, a polybutadiene is carboxylated so that a certain percentage of the carbon-carbon double bonds is modified by attachment of carboxyl groups which are then neutralized by a metal ion. This known process does not use polybutadiene having carboxyl groups attached to each chain end and when this polybutadiene is subjected to the operating conditions of said known process, there is no formation of homogeneous, coherent and thermoreversible gels.

BRIEF DESCRIPTION OF THE INVENTION

It has now been found that it is possible to obtain products in the form of homogeneous and coherent gels when prepolymers or polymers which contain at least one free acid group at each chain end and which are dissolved in a non polar solvent selected among the aliphatic, alicyclic and aromatic hydrocarbons having a dielectric constant of less than about 3 are reacted with a stoechiometric amount, based on the acid groups content of the polymer, of a metal aliphatic alkoxide so as to neutralize all the free acid groups and when the formed aliphatic alcohol is removed from the reaction mixture by distillation of part of said non polar solvent.

The reaction occuring in the process according to this invention, when dicarboxylic acid polymers are used, may be represented as follows:

In this reaction, P represents a polymer chain, Me represents a metal selected among the groups 1 to 4 of the Periodic Table, R represents an alkyl radical, v is the valence of the metal and n represents any number of moles of the reagents and of the neutralized diacid polymer chain.

The process according to this invention involves thus the removal of the alcohol of formula ROH from the reaction mixture containing the polymers in which the free acid groups present at each chain end have been neutralized by a metal ion.

The removal of the alcohol of formula I occurs by distillation of a part of the non polar solvent in which the prepolymer or polymer having at free end free acid groups is dissolved, the distillation of part of the non polar solvent causing the removal of the alcohol so as to change the equilibrium of the reaction in the direction of the formation of the neutralized polymer product.

It has been found that, when operating under the condition of the present invention, the above reaction occurs so as to reach a maximum conversion degree and to obtain a product having a maximum cohesion or having a maximum viscosity when dissolved in the non polar solvent, the products having unexpected properties.

According to this invention, it is possible to obtain homogeneous gels which are very resistant and thermoreversible in the non polar solvents, particularly in toluene and gasoline.

In the process according to this invention, prepolymers or polymers having free acid end groups are used, said prepolymers or polymers being free from acid groups attached to carbon-carbon double bonds.

As prepolymers or polymers having free acid groups at their chain ends, a very broad range of diacid polymers may be used, such as polydiene, polyolefin, polyacrylic, polyether, polyvinyl and polysiloxane polymers.

Particular examples of polymers which may be used in the process according to this invention are the polybutadiene α,ω-carboxylic diacids, polyisoprene α,ω-carboxylic diacids, poly-α-methylstyrenes, α,107 -carboxylic diacids, polyisobutene α,ω-carboxylic diacids, poly(ethylene oxide)α,ω-carboxylic diacids and butadiene-acrylonitrile copolymer α,ω-carboxylic diacids, or the poly-α-methylstyrene α,ω-phosphonic and sulfonic diacids, as well as the polydimethylsiloxanes which may comprise more than one carboxylic acid group at each chain end.

As non polar solvents which may be used in the process according to this invention, the aliphatic hydrocarbons, such as pentane, heptane or octane, the alicyclic hydrocarbons, such as tetrahydronaphthalene, and the aromatic solvents, such as benzene, toluene, gasoline, may be cited, said non polar solvents having a dielectric constant of less than about 3.

As polar solvents, in which the alkoxides of metals of the groups 1 to 4, such as lithium, sodium, potassium, caesium, copper, magnesium, zinc, baryum, beryllium, calcium, aluminum and tin, may be dissolved or suspended, alkanols, such as methanol, ethanol or isopropanol, which are identical to the alkanols from which the alkoxide is derived, are used.

According to an embodiment of the invention, the alkoxide may be formed in situ by reaction of an alkylmetal with the desired alkanol.

EXAMPLES

The following examples illustrate the process according to the invention.

Example 1: Magnesium polybutadiene α,ω-dicarboxylate (PBD Mg)

Magnesium methoxide is prepared by reacting in a dry balloon-flask of 100 ml, under a nitrogen atmosphere, 0.267 grams of magnesium turnings with 25 ml of anhydrous methanol (dried on sodium methoxide in the presence of traces of ethylacetate). The reaction mixture is heated at 50° C. during about 15 minutes so as to cause the reaction to start. After about 4 hours, a fine suspension of magnesium methanolate in methanol is obtained, said suspension being ready for use in the next step.

In a balloon-flask of 2 liters and under a nitrogen atmosphere, 50 grams of polybutadiene α,ω-carboxylic diacid (CTB Hycar of Goodrich, $\overline{Mn}=4,600$) are dried by distillation under reduced pressure (5 mm of Hg) in 100 ml of dry benzene, this distillation being repeated twice. The so dried polybutadiene α,ω-carboxylic diacid is dissolved in 1 liter of dry toluene (non polar solvent).

By means of a capillary tube in stainless steel the suspension of magnesium methanolate is introduced, in a stoechiometric amount, into the polybutadiene carboxylic diacid.

The methoxide is very reactive at room temperature (25° C.) and the reaction occurs spontaneously. For removing the methanol which solvates the formed ionic sites, the toluene is distilled under reduced pressure (5 mm of Hg), the present alkanol being removed together with the toluene. An equivalent amount of toluene is introduced into the flask each time that 100 ml of the non polar solvent (toluene) have been distilled. During this treatment, the viscosity of the solution considerably increases and finally the viscosity becomes stable after the distillation of 600 ml of toluene. A homogeneous gel of polymer having ionic links (PBD Mg) is thus obtained.

The infrared spectrum of the formed gel does not show any trace of absorption due to the —COOH function ($1740 \text{ cm}^{-1}$); on the contrary, a broad band, which is characteristic of the carboxylate functions, is present at $1600 \text{ cm}^{-1}$.

The relative viscosity of this product in toluene at 25° C. is of 2.80 at a concentration of 1 gram/dl, whereas the relative viscosity is of 1.46 before the removal of the methanol.

At a concentration of 1.26 grams/dl, the relative viscosity of the product reaches a value of 10.

Example 2: Zinc polybutadiene α,ω-dicarboxylate (PBDZn)

In a balloon-flask of 2 liters, 50 grams of polybutadiene α,ω-carboxylic diacid are dried by three successive distillations in dry benzene, as described in example 1.

1 liter of dry toluene and subsequently 20 ml of methanol are added to the polymer.

At room temperature, 10.9 ml of a molar solution of diethyl-zinc in toluene (obtained by dilution of Zn-ethyl$_2$; Fluka pract.) are then introduced drop by drop to the toluene-methanol solution of polybutadiene α,ω-carboxylic diacid. The present methanol causes the conversion, in situ, of the zinc-diethyl into zinc methoxide. In the absence of methanol, the reaction occurs also spontaneously, but the obtained product is heterogeneous.

The methanol is then removed as described in example 1. A homogeneous gel of polymers having ionic links (PBDZn) is obtained.

The infrared spectrum of the gel does not show any absorption band at $1740 \text{ cm}^{-1}$.

The relative viscosity of the gel reaches a value of 10 for a concentration of 1.64 grams/dl of zinc polybutadiene dicarboxylate.

Example 3: Magnesium polyisoprene α,ω-dicarboxylate (PiP Mg)

A polyisoprene α,ω-carboxylic diacid of a $\overline{Mn}$ of 69,000 is first prepared in the following manner.

(a) preparation of a naphthalene-potassium complex

Under a dry nitrogen stream, 1 g of freshly scraped potassium and 1.28 grams of pure naphthalene (Aldrich) are introduced into a dry balloon-flask of 250 ml. 100 ml of tetrahydrofurane, dried under reflux on a benzophenone-sodium complex and distilled just prior to use, are then added. After stirring during 4 hours at room temperature, the naphthalene-potassium complex is formed at a concentration of 0.1 mol/liter.

(b) preparation of polyisoprene α,ω-carboxylic diacid

In a balloon-flask of 1 liter containing 350 ml of dry tetrahydrofurane (dried as above described), 14.5 ml of the solution of the naphthalene-potassium complex prepared hereabove under (a) are introduced at room temperature. 0.4 ml of α-methylstyrene (Aldrich) previously dried on calcium hydride (Fluka) and distilled under vacuum are then introduced. The flask is then immersed in a bath of acetone saturated with carbo-ice (−78° C.). After 30 minutes, 73 ml of isoprene (Aldrich), dried on calcium hydride, are added drop by drop in about 15 minutes and, after a new time interval of 15 minutes, the content of the flask is brought to a temperature of about 0° C. and the solution is then introduced, by means of a capillary tube in stainless steel, into a balloon-flask containing about 1 g of anhydrous condensed $CO_2$.

After the addition of the total amount of the polymer solution, 1 ml of an aqueous concentrated solution of hydrochloric acid is added and the polymer is then precipitated in 5 liters of technical methanol, filtered and dried under vacuum.

(c) preparation of magnesium polyisoprene α,ω-dicarboxylate (PiP Mg)

In a dry balloon-flask of 100 ml, 0.0071 gram of magnesium turnings are attacked by 10 ml of anhydrous methanol.

On the other hand, 20 g of polyisoprene α,ω-carboxylic diacid ($\overline{Mn}=69,000$) are dried by azeotropic distillation of benzene and dissolved again in 500 ml of dry toluene.

A stoechiometric amount of magnesium methanolate is then added at room temperature to the polyisoprene solution. The formed methanol is finally removed as described in example 1.

The relative viscosity of the obtained gel varies in accordance with its concentration in the toluene. This viscosity also varies in accordance with the average number molecular mass ($\overline{Mn}$) of the polymer α,ω-carboxylic diacid.

It has been found that there is a critical concentration, beyond which a gel is obtained. This value varies in accordance with the molecular mass. The critical gelification concentration is of 1.54 grams/dl for a polyisoprene α,ω-carboxylic diacid of a $\overline{Mn}$ of 69,000 and of 2.28 grams/dl for a polyisoprene α,ω-carboxylic diacid of a $\overline{M}n$ of 36,200.

Example 4: Baryum polyisoprene α,ω-dicarboxylate (PIP Ba)

Baryum methanolate is prepared by reacting, under a nitrogen atmosphere, in a dry balloon-flask of 100 ml, 0.389 grams of baryum with 20 ml of anhydrous methanol. The reaction starts spontaneously at room temperature and must be moderated by cooling with a bath of melting ice.

Polyisoprene α,ω-carboxylic diacid is prepared by adding drop by drop at −78° C. dry isoprene to a solution of α-methylstyrene and of the naphthalene-potassium complex in a molar ratio of 2:1 in tetrahydrofurane. As soon as the polymerization is finished, the obtained product is deactivated by means of anhydrous $CO_2$.

20 g of polyisoprene α,ω-carboxylic diacid having a mean molecular mass in number ($\overline{M}n$) of 7100 are dried in a balloon-flask of 1 liter as described in example 1 and dissolved in 500 ml of dry toluene.

The baryum methanolate (stoechiometric amount) is then added, until stirring. The methanol is removed as described in example 1.

After complete removal of the solvent, a rubber-like material (PiP Ba) is obtained; said material does not flow. The morphological features have been determined by small angle X rays scattering. The heterogeneous character of the material is obvious and a periodicity of 55 Å has been recorded. This periodicity represents the distance between two zones containing metal ions separated by polymer chains.

Example 5: Aluminium polybutadiene α,ω-dicarboxylate (PBD Al)

Commercial aluminum isopropoxide (98%—Pierce Inorganics B.V.) is purified by distillation under a vacuum of $10^{-2}$ mm of Hg. The purified aluminium isopropanolate is then dissolved in dry toluene so as to obtain a concentration of 1.75 moles/liter.

In a balloon-flask of 2 liters, 50 grams of polybutadiene α,ω-carboxylic diacid ($\overline{M}n=4600$) are dried by azeotropic distillation of benzene and then dissolved in 1 liter of dry toluene. 20 ml of anhydrous methanol are then added at room temperature. 4.2 ml of the aluminum isopropoxide are then introduced drop by drop and the toluene is distilled so as to remove the alkanol as described in example 1. A completely gelified system is obtained (PBD Al). In the absence of methanol, the addition of Al isopropoxide gives a highly heterogeneous curdled product.

Example 6: Magnesium poly-α-methylstyrene α,ω-dicarboxylate (PMS Mg)

Magnesium methoxide is prepared by reacting 0.041 gram of magnesium turnings with 10 ml of anhydrous methanol as described in example 1.

On the other hand, poly-α-methylstyrene α,ω-carboxylic diacid having a molecular mass $\overline{M}n$ of 12,000 is prepared as follows:

In a ballon-flask of 500 ml containing 200 ml of anhydrous tetrahydrofurane, 27.5 ml of the naphthalene-potassium solution (0.1 mol./liter) as prepared in example 3 are introduced at room temperature. Thereafter, 27.5 ml (25 grams) of α-methylstyrene (Aldrich) dried on calcium hydride are added. While stirring the content of the flask, the latter is immersed in an acetone bath, the temperature of which is progressively decreased by addition of small pieces of carbonic acid snow (carbonic ice) until it reaches −78° C. The content of the flask is maintained at −78° C. during 15 minutes and is then poured into a balloon-flask of 1 liter containing about 1 gram of condensed dry $CO_2$. After deactivation, 1 ml of a concentrated aqueous solution of hydrochloric acid (12 N) is added. The polymer is then precipitated into 2 liters of technical methanol, filtered and finally dried under vacuum.

20 g of poly-α-methylstyrene α,ω-carboxylic diacid are dried by azeotropic distillation of benzene, and dissolved in 500 ml of dry toluene.

The suspension of magnesium methoxide (stoechiometric amount) is then added slowly and the toluene which removes the methanol formed during the reaction is distilled.

A gel of magnesium poly-α-methylstyrene dicarboxylate (PMS Mg) in toluene is obtained, said gel containing 4.8 grams/dl of the polymer PMS Mg.

Example 7: Magnesium poly-α-methylstyrene α,ω-disulfonate (PMS Mg)

Magnesium methoxide is prepared as described in example 1 by reacting 0.082 grams of magnesium turnings with 10 ml of methanol.

On the other hand, 10 grams of poly-α-methylstyrene α,ω-sulfonic diacid ($\overline{M}n=6,000$) are prepared as described in example 6, except that 84 ml of the naphthalene-potassium solution (0.1 mol./liter) are used.

The poly-α-methylstyrene-potassium is deactivated by introducing the solution thereof, at a temperature of −78° C. and through a capillary tube in stainless steel, in a flask containing 5 ml of propane sultone (Aldrich) distilled prior to its use. The hydrolysis of the potassium sulfonate into sulfonic acid is obtained by means of 1 ml of an aqueous concentrated solution of perchloric acid. The yield is of more than 95%.

The methanol suspension of magnesium methoxide is slowly added to 10 grams of poly-α-methylstyrene sulfonic diacid in 500 ml of dry toluene. During the reaction, the toluene which removes the methanol formed by the reaction is distilled.

A gel having a relative viscosity of 10, for a concentration of 4.45 grams/dl of magnesium poly-α-methylstyrene disulfonate is obtained.

Example 8: Beryllium polybutadiene α,ω-dicarboxylate (PBD Be)

0.225 gram of beryllium, 100 ml of dry tetrahydrofuran and 2.2 ml of 1.2-dibromoethane are introduced into a balloon-flask of 500 ml equipped with a refrigerator, under an inert atmosphere (dry nitrogen). The mixture is refluxed during 16 hours. After cooling to the temperature of melting ice, 31 ml of a 1.6 molar solution of n-butyl-lithium in hexane are added drop by drop. The tetrahydrofuran is distilled until a volume of 10 ml is obtained. 200 ml of anhydrous toluene are then added. A white precipitate (LiBr) is separated. A solution of butyl-beryllium is obtained.

The butyl-beryllium content of this solution, measured by titration with soda, is of 0.083 mol./liter.

In a flask of 3 liters, 40 grams of polybutadiene α,ω-carboxylic diacid (Hycar CTB; $\overline{M}n=4,600$; see example 1) are dried by azeotropic distillation of benzene and dissolved in 1 liter of dry toluene. 10 ml of anhydrous methanol are then added. 105 ml of the butyl-beryllium solution are added drop by drop, so that the butyl-beryllium, when contacted the methanol, is converted into beryllium methoxide.

The methanol is then removed by distillation of the non polar solvent (toluene) under reduced pressure, as described in the preceding examples.

In the absence of methanol, the addition of the butyl-beryllium gives a highly heterogeneous curdled material which cannot be used as such.

Example 9: Magnesium polyisobutene-α,ω-dicarboxylate (PiB Mg)

A suspension of magnesium methoxide is prepared by reacting 0.153 gram of magnesium turnings with 10 methanol, as described in example 1.

The magnesium methoxide suspension is added slowly to 13.2 g of polyisobuteneα,ω-carboxylic diacid (CTPiP, Exxon, $\overline{M}n=2150$) previously dried by azeotropic distillation of benzene and dissolved in 100 ml of anhydrous toluene.

The methanol is removed by distillation of benzene under reduced pressure (5 mm of Hg).

Example 10: Magnesium poly(ethylene oxide)α,ω-dicarboxylate (POE Mg)

The process described in example 7 is used, except that poly(ethylene oxide)α,ω-carboxylic diacid having a molecular mass ($\overline{M}n$) of 6,000 is used as polymer.

This polymer has been previously prepared, by treating a 10% toluene solution of a poly(ethylene oxide) α,ω-diol (polyglycol 6,000, Hoechst AG) by means of an excess of succinic anhydride, during 3 hours, at the reflux temperature.

A gel having a relative viscosity of 10 at a concentration of 1.72 grams/dl of magnesium poly(ethylene oxide)dicarboxylate (POE Mg) is obtained.

Example 11: Magnesium butadiene-acrylonitrile copolymer α,ω-dicarboxylic (PBD-AN-Mg)

Sodium methoxide is prepared as described in example 1, by using 0.75 g of magnesium and 25 ml of anhydrous methanol.

At room temperature, the suspension of magnesium methoxide is slowly added to a solution of 100 grams of butadiene-acrylonitrile copolymer α,ω-carboxylic diacid (HYCAR, CTBN, Goodrich, $\overline{M}n=3080$ containing 10% of acrylonitrile) previously dried by azeotropic distillation of 1 liter of anhydrous toluene.

The methanol is removed by distillation of toluene under reduced pressure in the manner described in example 1.

Example 12: Calcium polybutadieneα,ω-dicarboxylate (PBD Ca)

Calcium methoxide is prepared as described in example 1 for the preparation of magnesium methoxide, except that 0.44 grams of calcium are treated by the methanol.

The methanol solution of calcium methoxide is reacted on polybutadiene α,ω-carboxylic diacid, as described in example 1, the toluene being distilled in order to remove the methanol formed during the reaction.

A perfectly homogeneous gel is obtained, said gel having a relative viscosity of 10 at a concentration of 1.59 grams/dl of calcium polybutadiene α,ω-dicarboxylate (PBD Ca).

Example 13: Magnesium polydimethylsiloxane carboxylate (PDS Mg)

This example illustrates the preparation of gels of polymers having more than one COOH group at each chain end.

A polydimethylsiloxane having a molecular mass ($\overline{M}n$) of 20,000 and containing an average of 2.5 COOH groups at each end is prepared by synthesizing a trisequential copolymer of poly(isoprene-b-dimethylsiloxane-b-isoprene) containing 80% of polydimethylsiloxane by the method described by Marsiat and Gallot in "Makromolekulare Chemie", 176, page 1641 (1975). On the polyisoprene units an average of 2.5 molecules of mercaptoacetic acid is grafted by radicals by the process described by Sanui, Lenz and McKnight in "Journal of Polymer Science", Chemical Ed., 12, page 1965 (1974).

20 grams of this polymer are dried by azeotropic distillation of benzene and dissolved in 500 ml of dry toluene.

A solution of magnesium methoxide obtained by reaction of 0.061 grams of magnesium with 10 ml of anhydrous methanol is added to the toluene solution of the copolymer.

A homogeneous gel is obtained by removing the methanol with part of the toluene during the reaction.

Example 14: Magnesium polyisoprene α,ω-diphosphonate (PiP Mg)

Polyisoprene α,ω-diphosphonic acid is prepared as follows:

25 g of polyisoprenyl α,ω-disodium ($\overline{M}n=10,000$), obtained by anionic polymerization of isoprene (10% in tetrahydrofuran) started by the tetramer of α-methylstyrene ($2.5\times 10^{-3}$ mole) are deactivated on an excess (10 times) ($1.5\times 10^{-2}$ mole) of phosphoric oxichloride (POCl₃) purified by distillation from polyvinylpyridine (Brossas I., Clouet G. Double Liaison, XXV, no. 273, 205, May 1978).

After precipitation in the methanol, filtration, washing with methanol and drying, the polyisoprene is dissolved in 500 ml of toluene (5%); this solution, to which are added 250 ml of a 1 molar NaOH aqueous solution, is refluxed during 2 hours, so as to obtain disodium polyisoprene phosphonate according to the following reaction:

After decantation of the aqueous NaOH solution, the solution of disodium polyisoprene phosphonate is treated three times with 250 ml of an aqueous 1 molar solution of hydrochloric acid and then again three times with 250 ml of water, so as to obtain polyisoprene α,ω-phosphonic diacid according to the following reaction:

The polyisoprene α,ω-phosphonic diacid is finally precipitated in methanol; its functionality is of 1.9.

10 g of this polymer are dried by azeotropic distillation of benzene and then dissolved in 200 ml of dry toluene.

A suspension of magnesium methoxide in methanol, prepared as described in example 1 by reacting 0.10 g of magnesium with 10 ml of methanol, is added slowly to the toluene solution of the polyisoprene α,ω-phosphonic diacid.

The methanol is removed by distillation of toluene under reduced pressure, until a homogeneous gel is obtained.

Example 15: Copper polybutadiene α,ω-dicarboxylate (PBD Cu)

In a balloon-flask of 2 liters, 50 grams of polybutadiene α,ω-carboxylic diacid ($\overline{M}n = 4,600$) are dried by azeotropic distillation of benzene and dissolved in 1 liter of dry toluene.

A suspension of 1.38 grams of copper methoxide in 20 ml of toluene is prepared by the method described by Mehrotra R. C. in "Inorganica Chimica Acta Reviews", 1, 99 (1967). This suspension is added to the solution of polybutadiene α,ω-carboxylic diacid and the released methanol is removed as described in example 1.

At 25° C., in the toluene, the relative viscosity reaches a value of 10 for a concentration of 2.4 grams/dl of copper polybutadiene α,ω-dicarboxylate.

It has been found that the process according to this invention allows a maximum conversion degree of the reaction and a maximum cohesion of the obtained product in pure state or a maximum viscosity in solution. The amount of polymer necessary for obtaining a gel having a given cohesion is smaller when the ionic sites are less solvated by any polar compound (solvent or reaction product).

The products obtained by the process according to this invention may be used in the field of the lubricating oils. In this respect, the viscosity is a parameter of prime importance, which is generally controlled by the addition of thickening agents which are mostly high polymers. The addition of such polymers raises both a problem of the compatibility of said polymers with the oil and a problem of stability in function of the time due to the breaking of the macromolecules due to the continual shearing to which they are submitted.

An amount of about 5% by weight of the products obtained by the process according to this invention is already sufficient for obtaining lubricating oils having high viscosities. Moreover, the problem of compatibility with the oil is less critical, since the molecular mass of the polymers which are used in the process according to this invention may be very small ($\overline{M}n = 4,600$), whereas the chemical nature of said products may cover a very broad field. Finally, the stability problem is quite new, due to the rheothickening character of the products obtained by the process according to the invention, i.e. the increase of viscosity when the shearing increases.

The properties of the product (polybutadiene) obtained in example 1 have been compared to those of the same product, prepared under the same conditions, except that the formed methanol has not been removed by distillation.

Figure 1:
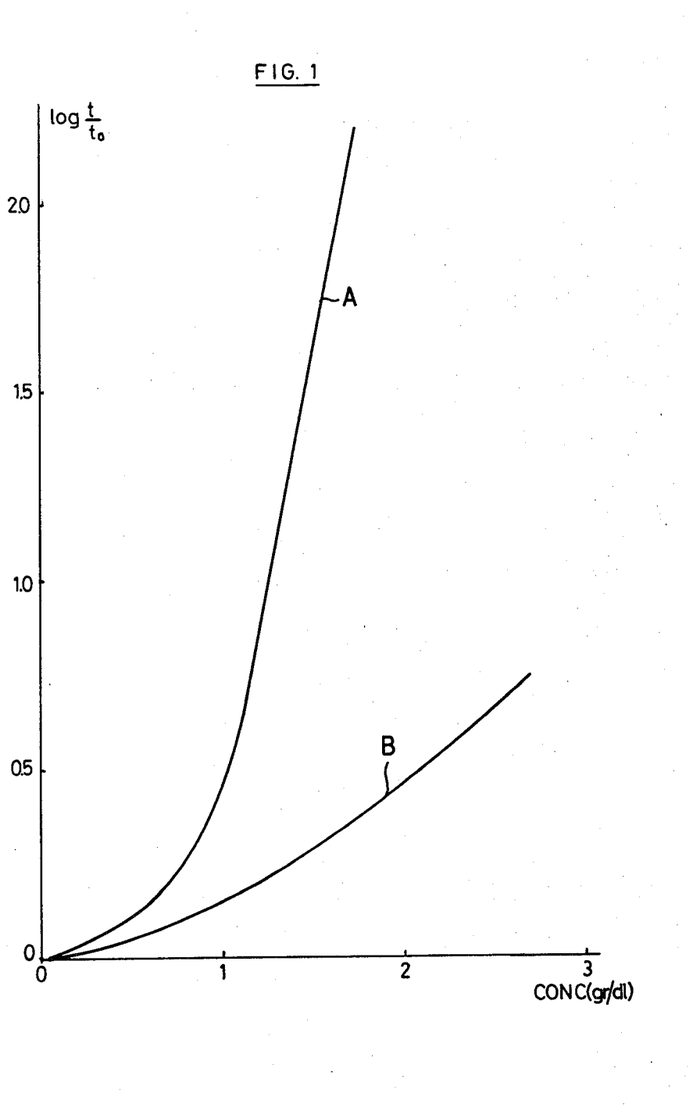

The graph of FIG. 1 of the attached drawings shows the variation of the relative viscosity of each product (expressed by the log $t/t_o$) in ordinate, as a function of the concentration of said products in abscissa. The solvent is toluene and the temperature is fixed at 25° C. Curve A is the curve obtained with the product prepared as described in example 1, whereas curve B is the curve obtained with the product prepared without removal of the methanol.

Figure 2:
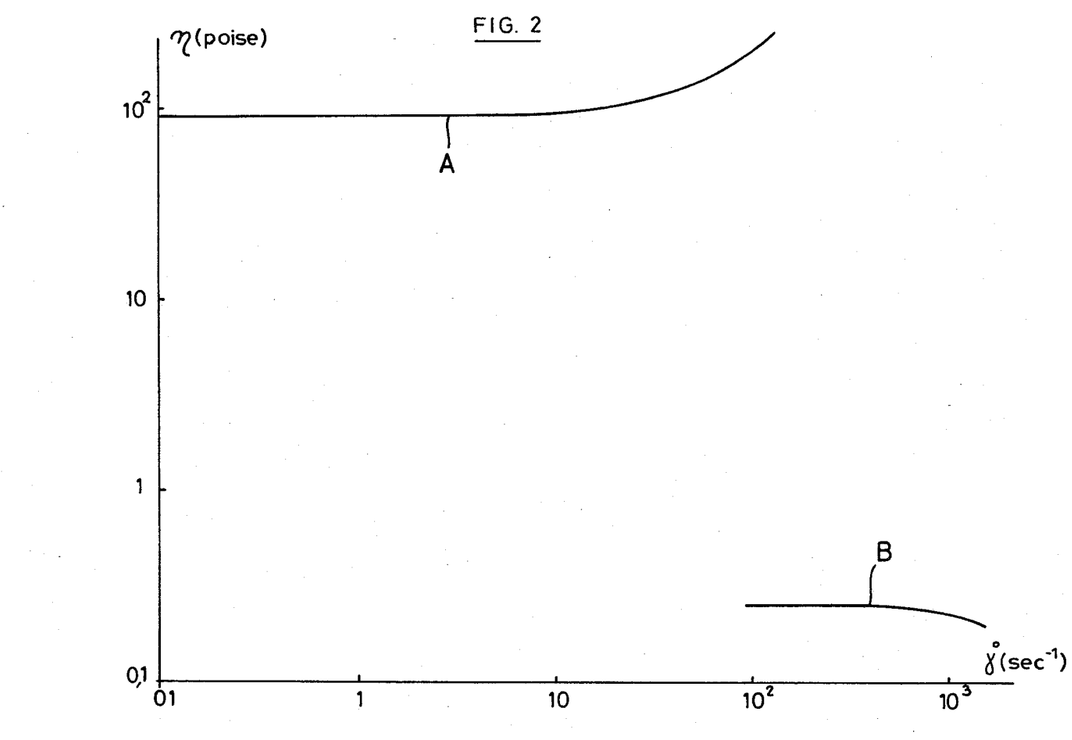

The graph of FIG. 2 shows the variation of the viscosity (expressed in poises $\eta$) in ordinate as a function of the speed gradient (expressed in $\dot{\gamma}(\sec^{-1})$) in abscissa, at a concentration of 4.7 grams/dl of the products in toluene at 23° C. The curves A and B of FIG. 2 relate respectively to the product obtained by the process according to the invention and to the same product obtained without removal of the methanol.

The graphs of the attached drawings show that:

(1) the viscosity of the product obtained according to the invention increases much more strongly than that of the product obtained without removal of methanol, when the concentration of the products in toluene increases;

(2) the product prepared by distillation of the formed methanol has a newtonian viscosity of 89 poises, whereas the viscosity is of 0.25 poises when the methanol is not removed;

(3) the speed gradient ($\dot{\gamma}$), at which a rheothickening effect appears is of about 10 sec⁻ in the product from which the methanol has been removed as described in example 1, whereas at a value of $\dot{\gamma} = 1000 \sec^{-1}$ (*i.e. for shearings which are* 100 times more important), the product from which the methanol has not been removed has still no rheothickening character; on the contrary, the latter product seems pseudoplastic.

It has also been found that, when the synthesis solvent is removed therefrom, the polymers having ionic links obtained by the process according to this invention have all the characteristics of adhesives of the hot melt type. These products act quickly as adhesives and do not need any solvent. The adhesive polymer needs only to be placed between the surfaces to be glued, said surfaces being then heated at a suitable temperature while being pressed against each other.

For illustrating the adhesive character of the ionic polymers obtained by the process according to the invention, two substrates have been used, namely stainless steel and aluminium. Under the same conditions, two commercial adhesives have been tested, i.e. a thermohardening adhesive, namely Araldite (hardener: 927 576, resin 927 536, Ciba Geigy) and an adhesive containing a solvent, namely the Scotch (3M). These two previously known adhesives require hardening times of several hours at room temperature, whereas the polymers having ionic links obtained by the process according to this invention only need a hardening time of 5 minutes at a temperature of about 120° C.

The glued surfaces having a length of 1 inch and a width of 0.5 inches are submitted to shearing stresses by means of an Instrom tensile machine operating at a constant speed. The results expressed in Kg/cm2 are given in the following table (ASTM-D 1002-64).

TABLE I

| Stainless steel (5 mm/min.) | | Aluminium (1 mm/min) | |
|---|---|---|---|
| Adhesives | Average value of three tests | Adhesives | Average value of three tests |
| Araldite | 11.4 | Araldite | 10.8 |
| Scotch | 10.2 | Scotch | 10.1 |

TABLE I-continued

| Stainless steel (5 mm/min.) | | Aluminium (1 mm/min) | |
|---|---|---|---|
| Adhesives | Average value of three tests | Adhesives | Average value of three tests |
| PiP Mg - $\overline{Mn}$ = 16,000 | 11.0 | PiP Mg - $\overline{Mn}$ = 69,000 | 11.1 |
| PBDCa - $\overline{Mn}$ = 4,600 | 12.1 | PiP Mg - $\overline{Mn}$ = 36,000 | 12.0 |
| PBDMg - $\overline{Mn}$ = 4,600 | 7.9 | PiP Mg - $\overline{Mn}$ = 20,000 | 14.6 |
| PBD—AN.Mg (10% AN) | 15.2 | PiP Mg - $\overline{Mn}$ = 15,500 | 14.0 |
| PBD—AN—MG (17% AN) | 17.6 | PiP Mg - $\overline{Mn}$ = 7,000 | 28.7 |
| | | PiP Ca - $\overline{Mn}$ = 15,500 | 13.7 |

The polymers provided with ionic links obtained by the process according to this invention used as adhesives of the hot-melt type have a large use flexibility. The results given in table I show that by changing the chemical nature of the polymer chain, the molecular mass thereof or the nature of the cation, it is possible to modify the shearing resistance and thus to adapt the product to the user's requirements. The polymers disclosed in table I remain flexible at room temperature. Therefore, they can suitably be used for glueing surfaces which are subjected to deformations. However, when the PiP or PBD flexible chains are replaced by more rigid chains, it is possible to obtain a number of products having properties similar to those of the thermosetting adhesives (Araldite).

Figure 3:
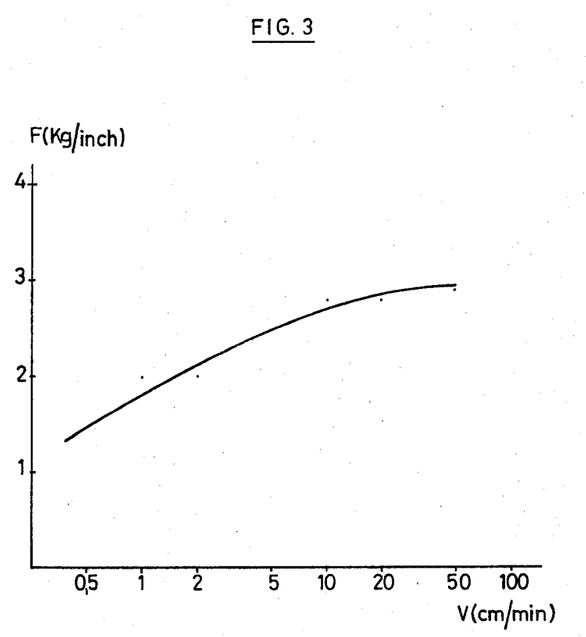

The polymers having ionic links, obtained by the process according to this invention, when used as adhesives, have also a very good peeling resistance. FIG. 3 of the attached drawings shows the relationship between the tensile speed V and the peeling force F which is necessary for separating an aluminum sheet having a width of 1 inch glued on stainless steel plate. The traction angle is of 180°. The glueing has been effected at a temperature of 120° C. under a pressure of about 5 kg/m2 during 5 minutes.

Under similar conditions, it is known (J. Appl. Polym. Sci., 23, 2603, 1979) that the peeling force is of 2.1 kg/inch for Araldite # 400 B (Ciba Geigy) and of 2 to 4.4 for a series of terpolymers, such as, for example, magnesium monohydroxyethylphthalate-maleic anhydride-hexahydrophthalic acid diglycidylether (1:10:5); these results relate to a peeling speed of 26 cm/min.

The polymers obtained by the process according to this invention also form gels or very viscous solutions with fuels.

To 10 grams of polybutadiene $\alpha,\omega$-carboxylic diacid having an average molecular mass ($\overline{Mn}$) of 4,600, dissolved in 200 ml of gasoline of the super type for motor vehicles, aluminum isopropoxide are added under conditions described in example 5 (0.85 ml of 1.75 molar solution of Al(OR)$_3$). After reflux heating, a homogeneous gel is obtained. In the same manner as the product obtained in the presence of toluene (example 5), this gel substantially vibrates when it is submitted to a shock; its elastic component is therefore preponderant. This property allows the storage and transport of hydrocarbons and fuels under much safer conditions. Moreover, the hydrocarbons and fuels mixed with products obtained by the process according to this invention burn much more slowly than an identical volume of an untreated fuel, the combustion hearth or focus remaining localized; on the contrary, the whole mass of a liquid fuel immediately bursts into flame.

When the synthesis solvent is removed from the polymers obtained by the process according to this invention, the obtained products also improve the impact resistance of widely spread polymers, such as polyvinyl chloride (PVC), as shown by the results of following table II.

The Charpy test (DIN 53453-1958) has been used. The tested PVC was "Solvic RD 258" (Solvay, Belgium). Dibutyl tin octanoate (2%) was used as stabilizing agent.

TABLE II

| Tested materials | | Impact resistance (kgcm/cm2) |
|---|---|---|
| PVC alone | — | 7.6 |
| PVC + PBD diacid | 9% | 5.2 |
| PVC + PBD Mg | 3% | 9.0 |
| PVC + PBD Mg | 6% | 14.1 |
| PVC + PBD Mg | 8% | 21.7 |
| PVC + PBD Mg | 9% | 17.8 |
| PVC + PBD Mg | 12% | 15.2 |
| PVC + PBD Mg | 16% | 10.0 |
| PVC + PBD Be | 9% | 27.7 |
| PVC + PBD Ba | 9% | 17.9 |

This table shows that the addition of PBD diacid decreases the impact resistance, whereas the addition of PBD having ionic links obtained by the process according to this invention gives optimum results according to the used percentage.

In respect of the cation, it is to be noted that the more the size of this cation is small, the better the impact resistance is.

Finally, the polymers having ionic links obtained by the process according to this invention may be used for the transfer of mechanical-acoustical pulses.

Figure 4:
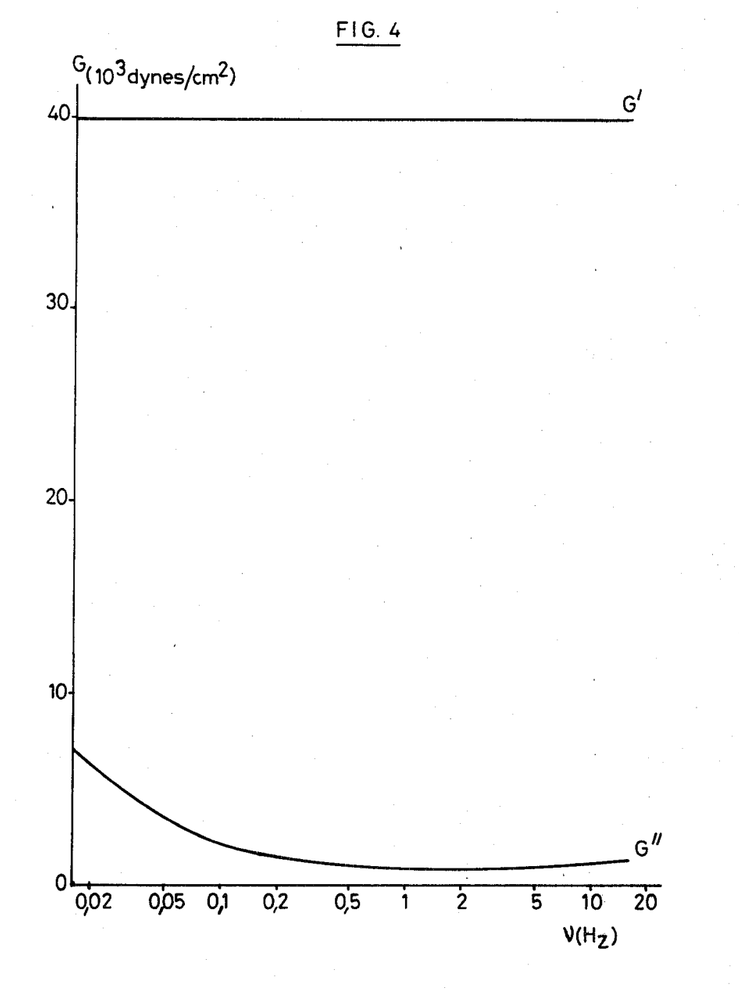

In the gels containing, for example, 4 to 10% of PBD-Al and 96 to 90% of toluene, the mechanical pulses are only absorbed very weakly. FIG. 4 of the attached drawings shows the storage (G') and loss (G") torsion modules according to the frequency M (Hz) in the range from $16.10^{-3}$ Hz to 16 Hz. Except at very low frequencies ($5.10^{-2}$ Hz), the loss modulus (which is related to the energy dissipated by friction) is negligible in respect with the storage modulus (related to the elasticity). Moreover, the storage modulus is quite independent from the frequency in the whole range. The gel behaves therefore as an elastic material.

The used test device (Rheometrics RMS 7200) does not allow a test at frequences of more than 16 Hz. It seems however obvious that this type of behavior is maintained beyond 16 Hz, i.e. in the audible frequency range, probably up to at least 1000 Hz. Moreover, according to the time-temperature equivalence principle, to which obey the tested gels, it can be foreseen that the behavior of the tested product until 16 Hz will be the same at higher frequencies thanks to a temperature increase.

What is claimed is:

1. A process for preparing viscous, homogeneous and thermoreversible gels containing polymer chains, in which a solution of a prepolymer or polymer which contains a free acid group only at each chain end in a non polar solvent selected among the aliphatic, alicyclic and aromatic hydrocarbons having a dielectric constant of less than about 3 is reacted, at room temperature, with a stoichiometric amount based on the acid group content of the polymer of a metal aliphatic alkoxide, so as to neutralize all the free acid groups and a sufficient fraction of the non polar solvent is distilled for removing, in a substantially quantitative manner, the aliphatic alcohol formed by said reaction.

2. A process according to claim 1, in which the prepolymer or polymer contains at least one group selected among the free carboxyl, sulfonic and phosphonic groups at each chain end.

3. A process according to claim 1, in which the prepolymer or polymer having at least one free acid group at each chain end is selected among the polydiene, polyolefin, polyacrylic, polyether, polyester, polyvinyl and polysiloxane polymers.

4. A process according to claim 1, in which a prepolymer or polymer selected among the polybutadiene $\alpha,\omega$-carboxylic diacids, polyisoprene $\alpha,107$-carboxylic diacids, poly-$\alpha$-methylstyrene $\alpha,\omega$-carboxylic diacids, polyisobutene $\alpha,\omega$-carboxylic diacids, poly(ethylene oxide) $\alpha,\omega$-carboxylic diacids, copolymers butadiene-acrylonitrile $\alpha,\omega$-carboxylic diacids, polystyrene $\alpha,\omega$-carboxylid diacids and the poly-tert.-butylstyrene $\alpha,\omega$-carboxylic diacids is used.

5. A process according to claim 1, in which a prepolymer or polymer selected among the poly-$\alpha$-methylstyrene $\alpha,\omega$-sulfonic diacids, polystyrene $\alpha,\omega$-sulfonic diacids, poly-tert.butylstyrene $\alpha,\omega$-sulfonic diacids, polybutadiene $\alpha,\omega$-sulfonic diacids and polyisoprene $\alpha,\omega$-sulfonic diacids is used.

6. A process according to claim 1, in which a prepolymer or polymer selected among the polyisoprene $\alpha,\omega$-phosphonic diacids, polybutadiene $\alpha,\omega$-phosphonic diacids, polystyrene $\alpha,\omega$-phosphonic diacids, poly-$\alpha$-methylstyrene $\alpha,\omega$-phosphonic diacids and poly-tert. butylstyrene $\alpha,\omega$-phosphonic diacids is used.

7. A process according to claim 1, in which the non polar solvent is toluene.

8. A process according to claim 1, in which the reaction mixture is distilled until a gel containing about 2 to 10% by weight of neutralized polymer is obtained.

9. A process according to claim 1, in which the metal alkoxide contains about 1 to 4 carbon atoms.

10. A process according to claim 1, in which the metal alkoxide is dissolved or suspended in a polar solvent consisting of a lower aliphatic alcohol.

11. A process according to claim 10, in which the polar solvent of the metal alkoxide is the aliphatic alcohol from which said alkoxide is derived.

12. A process according to claim 1, in which the metal of the alkoxide is selected among the copper, magnesium, zinc, baryum, aluminum, beryllium and calcium.

13. A process according to claim 1, in which the metal alkoxide is formed in situ by reaction of an alkylmetal with the desired alcohol.

* * * * *